(12) United States Patent
Du et al.

(10) Patent No.: US 8,219,120 B2
(45) Date of Patent: Jul. 10, 2012

(54) INFORMATION MANAGEMENT METHOD AND SYSTEM

(75) Inventors: Hanmei Du, Shenzhen (CN); Ke Zeng, Shenzhen (CN); Hongcheng Zhuang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 914 days.

(21) Appl. No.: 12/256,915

(22) Filed: Oct. 23, 2008

(65) Prior Publication Data

US 2009/0046619 A1 Feb. 19, 2009

Related U.S. Application Data

(63) Continuation of application No. PCT/CN2007/001356, filed on Apr. 24, 2007.

(30) Foreign Application Priority Data

Apr. 26, 2006 (CN) .......................... 2006 1 0075733
May 18, 2006 (CN) .......................... 2006 1 0081327

(51) Int. Cl.
*H04W 68/00* (2009.01)
(52) U.S. Cl. .................. 455/458; 455/432.1; 455/456.1; 455/461; 455/525; 370/338
(58) Field of Classification Search ............... 455/432.1, 455/456.1, 458, 461, 525; 370/338
See application file for complete search history.

(56) References Cited

U.S. PATENT DOCUMENTS

| | | | |
|---|---|---|---|
| 6,747,961 B1 * | 6/2004 | Ahmed et al. | ................ 370/328 |
| 7,230,934 B2 | 6/2007 | Choi | |
| 2004/0198383 A1 | 10/2004 | Choi | |
| 2005/0003836 A1 | 1/2005 | Inoue et al. | |
| 2006/0099972 A1 * | 5/2006 | Nair et al. | ...................... 455/458 |
| 2007/0105567 A1 * | 5/2007 | Mohanty et al. | .............. 455/458 |
| 2007/0191031 A1 * | 8/2007 | Mohanty et al. | .............. 455/458 |

FOREIGN PATENT DOCUMENTS

| | | |
|---|---|---|
| CN | 1468008 A | 1/2004 |
| CN | 1575023 A | 2/2005 |

OTHER PUBLICATIONS

State Intellectual Property Office of the People's Republic of China, Written Opinion of the International Searching Authority in the International Patent Application No. PCT/CN2007/001356 (Aug. 2, 2007).

State Intellectual Property Office of the People's Republic of China, Office Action of Chinese Patent Application No. 2006100813271 (Jan. 15, 2010).

* cited by examiner

*Primary Examiner* — Rafael Pérez-Gutiérrez
*Assistant Examiner* — Liton Miah
(74) *Attorney, Agent, or Firm* — Leydig, Voit & Mayer, Ltd.

(57) ABSTRACT

An information management method and an information management system are provided. The method mainly includes the following steps. A first message is sent to a foreign agent (FA) of a mobile station (MS) after a paging controller (PC) is redirected. The first message includes information of a new PC after redirection. The FA stores the information of the new PC and sends a response message to the first message to the PC. The following technical effects are achieved by the present invention through the above technical solutions. An anchor PC before redirection or a new anchor PC after redirection reports an ID of the new anchor PC to the FA, so the FA gets to know an address of the new anchor PC when paging and thus implements the paging process successfully.

4 Claims, 13 Drawing Sheets

Location Register
Paging Controller
Paging Agent

| Information Elements | Description | Mandatory or Optional | Remarks |
|---|---|---|---|
| MS ID | MAC Address of the MS | M | The ID indicates the MS that sends the request. |
| BS ID | Base Station Identification | M | The BS ID indicates the BS where the MS implements location update. |
| Authentication Indication | Indicating whether or not have security information (AK and AK context or Anchor Authenticator ID for this MS) for verifying RNG_REQ | Undetermined | 0: Do not have authentication information<br>1: Have authentication information |
| Anchor PC Relocation Destination | Request for a new anchor PC | O | ID of the target anchor PC |
| Paging Offset | Paging Offset t | O | Paging offset assigned by the local PC |
| Paging Cycle | Paging Cycle | O | Paging cycle assigned by the local PC |
| Power Down Indicator | The IE indicates that the MS is currently intended to power down. | O | Included when the location update is triggered by the powering down of the MS. |

FIG. 4

| Information Elements | Description | Mandatory or Optional | Remarks |
|---|---|---|---|
| MS ID | MAC Address of the MS | M | The ID indicates the MS that sends the request. |
| BS ID | Base Station Identification | M | The BS ID indicates the BS where the MS implements location update. |
| Event code | EC=03, Location Update | M | EC=00, MS enters an idle mode<br>EC=01, Exit the idle mode—network paging<br>EC=02, MS exits the idle mode<br>EC=03, Location update<br>EC=11, Data reaches the MS in the idle mode |

FIG. 5

| Information Elements | Description | Mandatory or Optional | Remarks |
|---|---|---|---|
| MS ID | MAC Address of the MS | M | The ID indicates the MS that sends the request. |
| BS ID | Base Station Identification | M | The BS ID indicates the BS where the MS implements location update. |
| Event Code | EC=03, Location Update | M | Indicating the message response of the MS is included in the location update context from the MS. |
| AK Context | AK and AK context | M | |

FIG. 6

| Information Elements | Description | Mandatory or Optional | Remarks |
|---|---|---|---|
| MS ID | MAC Address of the MS | M | The ID indicates the MS that sends the request. |
| BS ID | Base Station Identification | M | The BS ID indicates the BS where the MS implements location update. |
| PC ID | ID of Paging Controller (for example, IP address) | M | The PC ID indicates the paging controller of the MS. |
| Anchor Authenticator ID | ID of Anchor Authenticator | M | ID of the anchor authenticator |
| AK Context | AK and AK Context | M | The security context requested by the BS is used to verify the RNG-REQ message from the MS and a RNG-RSP message assigned by a valid HMAC is returned. |
| PGID | ID of Paging Group | M | The PG ID is assigned by the anchor PC. |
| Paging Offset | Paging Offset | M | The paging offset is assigned by the anchor PC. |
| Paging Cycle | Paging Cycle | M | The paging cycle is assigned by the anchor PC. |
| Anchor PC ID | ID of Anchor PC | M | Anchor PC ID |
| Relocation Request Response | Response to Relocation Request | O | "Accept" or "Refuse" |
| MS Data Structure | The message needs to be transmitted to a new anchor PC from the original anchor PC. | M (If the redirection request response is "accept") | If the above Information Elements is "Refuse", this domain should be ignored. |
| Location Update Status | Indicating whether the location update process needs to continue or not; if being refused, the serving BS requests the MS to implement an unsafe location update. | M | "Accept" or "Refuse" |

FIG. 7

| Information Elements | Description | Mandatory or Optional | Remarks |
|---|---|---|---|
| MS ID | MAC Address of MS | M | The ID indicates the MS that sends the request. |
| BS ID | Base Station Identification | M | The BS ID indicates the BS where the MS implements location update. |
| LU Result Indicator | Indication about Success/Failure of LU | M | 0: Failure<br>1: Success |

| Information Elements | Description | Mandatory or Optional | Remarks |
|---|---|---|---|
| MS ID | MAC Address of the MS | M | The ID indicates the MS that sends the request. |
| BS ID | Base Station Identification | M | The BS ID indicates the BS where the MS implements location update. |
| Event code | EC=04, anchor PC redirection | M | EC=00, MS enters an idle mode<br>EC=01, Exit the idle mode—network paging<br>EC=02, MS exits the idle mode<br>EC=03, Location update<br>EC=04, Relocation of the anchor PC<br>EC=11, Data reaches the MS in the idle mode |
| anchor PC ID | ID of Anchor PC | M | Anchor PC |

FIG. 12

| Information Elements | Description | Mandatory or Optional | Remarks |
|---|---|---|---|
| MS ID | MAC Address of the MS | M | The ID indicates the MS that sends the request. |
| BS ID | Base Station Identification | M | The BS ID indicates the BS where the MS implements location update. |
| Event code | EC=04, anchor PC redirection | M | EC=00, MS enters an idle mode<br>EC=01, Exit the idle mode—network paging<br>EC=02, MS exits the idle mode<br>EC=03, Location update<br>EC=04, Relocation of the anchor PC<br>EC=11, Data reaches the MS in the idle mode |

| Information Elements | Description | Mandatory or Optional | Remarks |
|---|---|---|---|
| MS ID | MAC Address of the MS | M | The ID indicates the MS that sends the request. |
| BS ID | Base Station Identification | M | The BS ID indicates the BS where the MS implements location update. |
| Event code | EC=04, anchor PC redirection | M | EC=00, MS enters an idle mode<br>EC=01, Exit the idle mode—network paging<br>EC=02, MS exits the idle mode<br>EC=03, Location update<br>EC=04, Relocation of the anchor PC<br>EC=11, Data reaches the MS in the idle mode |
| anchor PC ID | ID of Anchor PC | M | Anchor PC |

FIG. 16

| Information Elements | Description | Mandatory or Optional | Remarks |
|---|---|---|---|
| MS ID | MAC Address of the MS | M | The ID indicates the MS that sends the request. |
| BS ID | Base Station Identification | M | The BS ID indicates the BS where the MS implements location update. |
| Event code | EC=04, anchor PC redirection | M | EC=00, MS enters an idle mode<br>EC=01, Exit the idle mode—network paging<br>EC=02, MS exits the idle mode<br>EC=03, Location update<br>EC=04, Relocation of the anchor PC<br>EC=11, Data reaches the MS in the idle mode |

INFORMATION MANAGEMENT METHOD AND SYSTEM

CROSS-REFERENCE TO RELATED APPLICATION

This application is a continuation of International Patent Application No. PCT/CN2007/001356, filed Apr. 24, 2007, which claims priority to Chinese Patent Application No. 200610075733.7, filed Apr. 26, 2006 and Chinese Patent Application No. 200610081327.1, filed May 18, 2006, all of which are hereby incorporated by reference in their entirety.

FIELD OF THE INVENTION

The present invention relates to the communication field, and more particularly, to an information management method and an information management system applicable to a communication system, such as a worldwide interoperability for microwave access (WiMAX) communication system.

BACKGROUND

Figure 1:
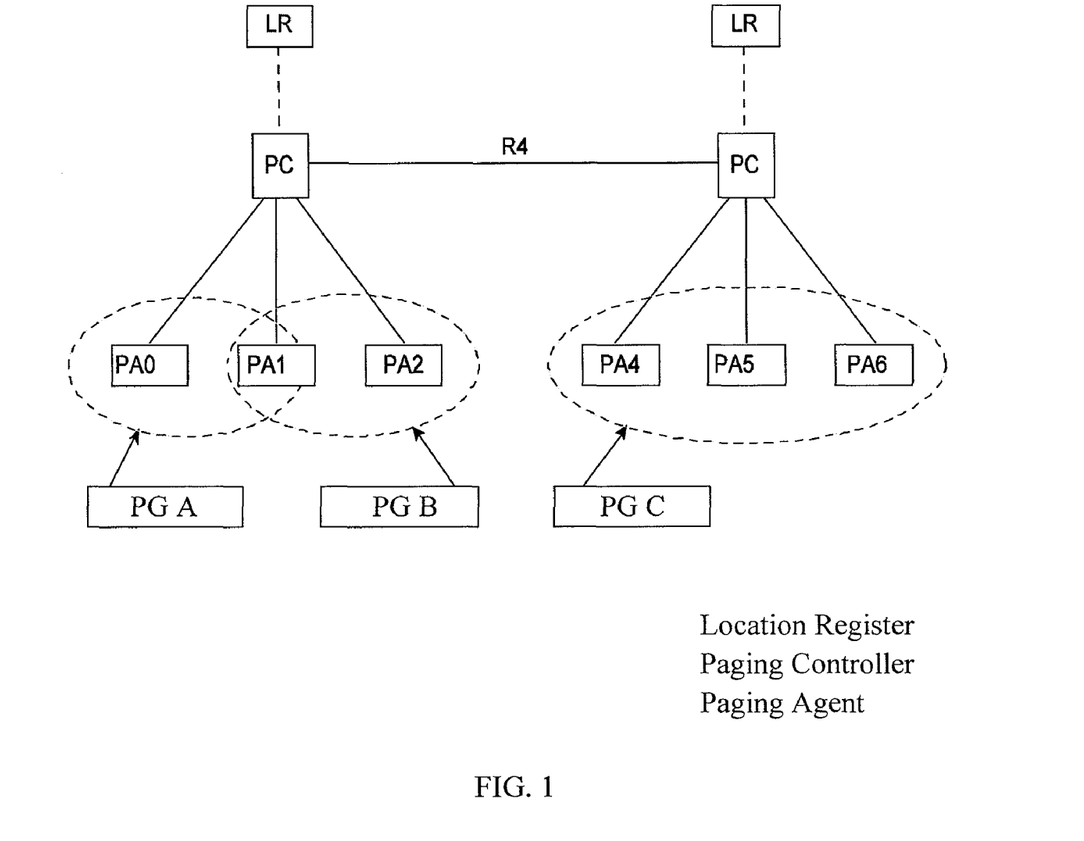
FIG. 1 is a schematic structural view of a WiMAX paging network in the prior art.

Referring to FIG. 1, in a worldwide interoperability for microwave access (WiMAX) communication system, paging and idle mode operations of a mobile station (MS) involve the following functional entities: paging controllers (PCs), paging agents (PAs), paging groups (PGs), and location registers (LRs).

The PC decides the behavior of the MS in an idle mode in the network. The PC defines a parameter, PC ID, which indicates a 6-byte address of one PC functional entity. The PA is located at a base station (BS) for solving a problem about an interaction between the PC and paging related functional entities in the BS as defined in the Institute for Electrical and Electronics Engineers (IEEE) 802.16e. The PG should be large enough so that the MS is held in the same PG most of the time, and it should be small enough to reasonably distribute the paging load. A LR is a distributed database, each LR corresponds to one PC, and the LR contains MS information in the idle mode, which includes current PG ID, paging cycle (PAGING_CYCLE), paging offset (PAGING_OFFSET), latest reported BS ID, latest reported relay PC ID, and MS service flow information.

Figure 2:
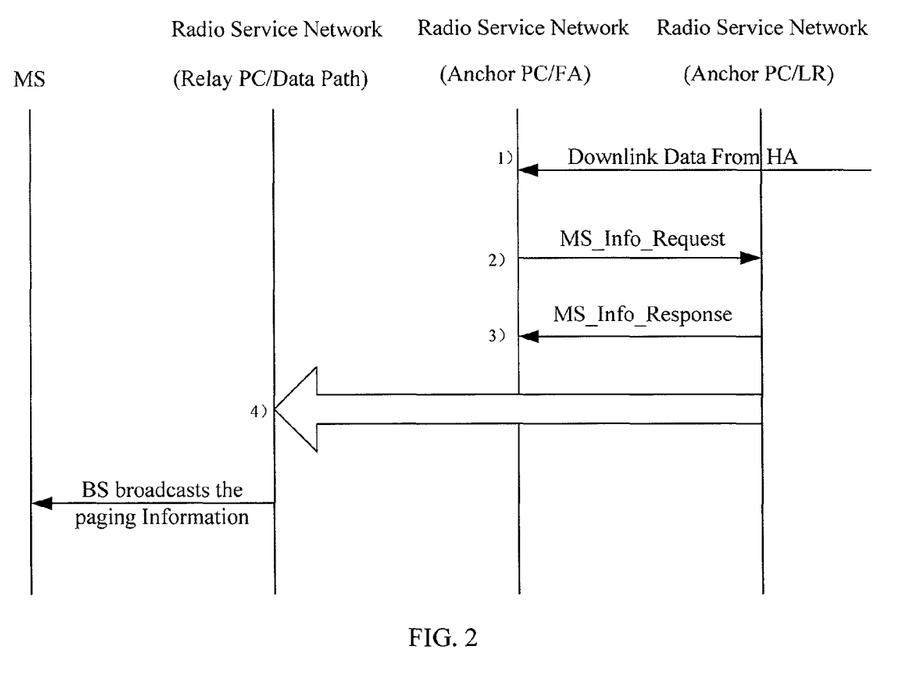
FIG. 2 is a timing chart of a paging process in a WiMAX network in the prior art.

Referring to FIG. 2, in the WiMAX communication system, an existing paging process includes the following steps.

In Step 1, data from a home agent (HA) reaches an anchor foreign agent (FA) and a related data path function (DPF), and is buffered there.

In Step 2, the anchor DPF recognizes that a MS is in an idle mode and needs to be activated and the data needs to be transmitted to the MS. An anchor FA sends a MS information request (MS_Info_Request) message to an anchor PC/LR in order to obtain paging information of the MS and request paging for the MS.

In Step 3, the anchor PC/LR sends MS-related information to the anchor DPF through a MS information response (MS_Info_Response) message.

In Step 4, the anchor PC generates a paging announcement message and sends one or more paging announcement messages to other paging areas known by the anchor PC.

When the MS is in an idle mode, it sends a ranging request (RNG-REQ) message to a BS according to four different conditions, so as to trigger the PA to send a location update (LU) message. The RNG-REQ message sent to the BS by the MS includes an ID of the current anchor PC of the MS. When the MS moves in the idle mode, the anchor PC may be far away from the position where the LU is initiated currently. In this manner, it is necessary to redirect the anchor PC. This is one of the above four conditions for initiating a LU.

In the existing location updating process for the WiMAX communication system, after the PC receives a LU request message from the PA, it immediately returns a LU response message to the PA. If a relay PC exists, the PA sends the LU message to the relay PC first, and then the relay PC sends the message to the anchor PC. After receiving the LU request message, the anchor PC immediately sends the LU response message to the relay PC. Then, the relay PC sends the response message to the PA. After receiving the response message, the PA sends a LU acknowledgement message to the relay PC. Then, the relay PC sends the acknowledgement message to the anchor PC.

The RNG-REQ sent to the BS by the MS includes the ID of the current anchor PC of the MS: PC ID. When the MS moves in the idle mode, the anchor PC may be far away from the position where the LU is currently initiated. In this manner, it is necessary to redirect the anchor PC.

Figure 3:
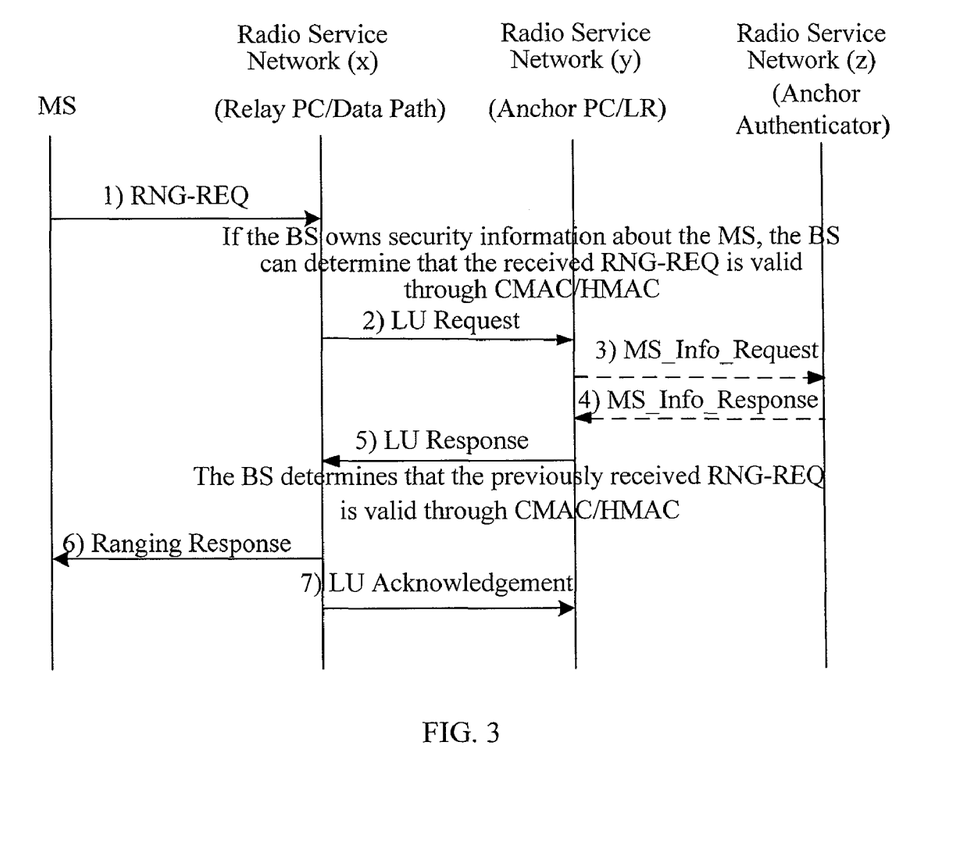
FIG. 3 is a timing chart of a location update process in a WiMAX network in the prior art.
Figure 4:
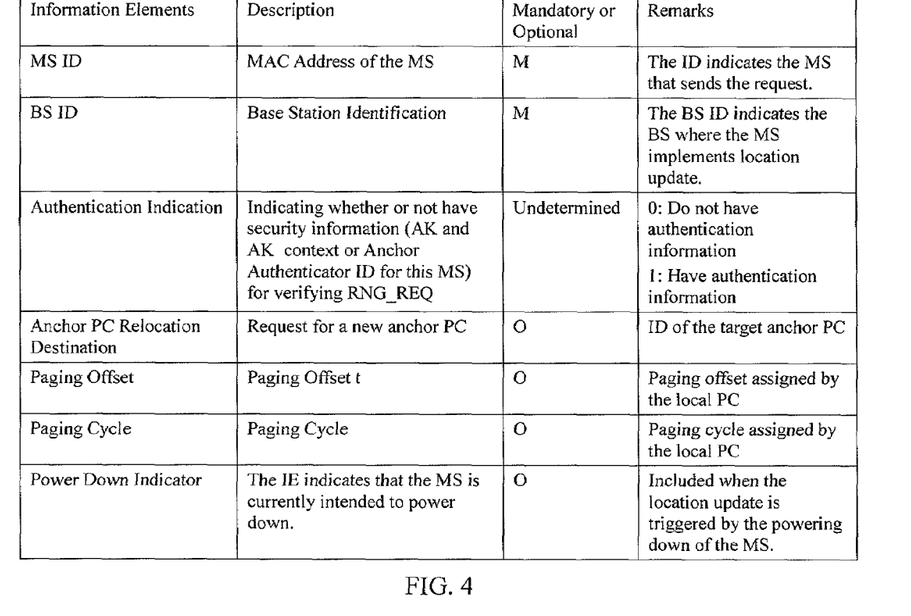
FIG. 4 is a table showing a primitive structure of a location update (LU) request message in the prior art.
Figure 5:
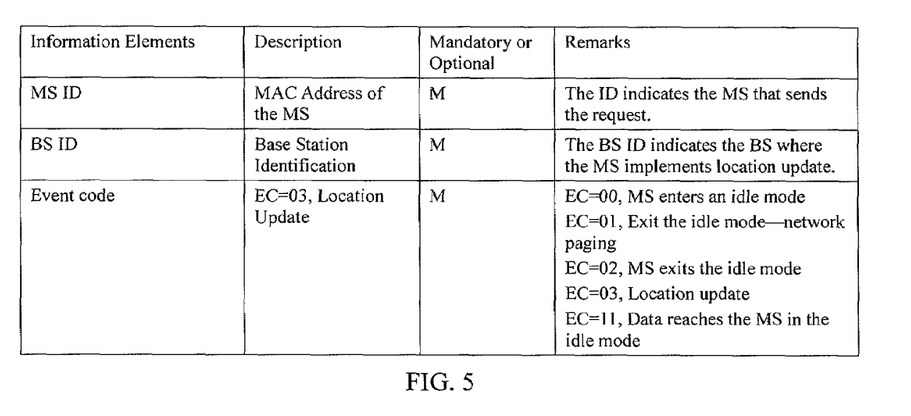
FIG. 5 is a table showing a primitive structure of a MS_Info_Request message in the prior art.

The process of redirecting an anchor PC by a MS is described below with reference to FIGS. 3 to 5.

In Step 1, the MS sends a RNG-REQ message to a serving BS (SBS, the BS where the PA is located). The RNG-REQ message includes a destination of the LU, as well as an ID of the current anchor PC of the MS.

Then, Step 2 is performed as follows.

1) The BS searches to determine whether it has valid security information or not, so as to verify the RNG-REQ message of the MS. The security information is an anchor authenticator ID, or an authentication key (AK), and AK context buffered in the MS. If the RNG-REQ message requests redirecting the anchor PC, it should further include a redirection address of the anchor PC, i.e. PC ID.

2) Once a relay PC receives a LU request message from the SBS, if the SBS owns the valid security information of the MS, it directly performs Step 5 below; otherwise, the relay PC forwards the LU request message to the anchor PC. The message includes a security information indication for notifying the anchor PC that the SBS does not reserve the security information. A primitive structure of the LU request message is shown in FIG. 4.

In Step 3, after receiving the LU request message, the anchor PC searches relevant information from a LR. If the anchor authenticator stores some security information, the anchor PC extracts the anchor authenticator ID of the MS and then sends an MS_Info_Request message to the anchor authenticator. A primitive structure of the MS_Info_Request message is shown in FIG. 5.

In Step 4, after receiving the MS_Info_Request message, the anchor authenticator generates the AK and AK context of the MS and then sends a MS_Info_Response message to the anchor PC. A primitive structure of the MS_Info_Response message is shown in FIG. 6.

In Step 5, an ASN where the anchor PC of the MS is located sends a LU response message to the relay PC. The LU response message includes MS ID, BS ID, assigned PG ID, anchor PC ID, PAGING_CYCLE, PAGING_OFFSET, MS data structure, and LU status. If a source address (i.e., the anchor PC) is assigned with a different anchor PC, the PC ID thereof is included in the LU response message. If an authentication indication included in the LU request message indicates that the SBS do not have the valid security information of the MS, the anchor authenticator ID is also included. If the LU request message requests relocating the anchor PC, the LU response message may include a response to the redirection request. A primitive structure of the LU response message is shown in FIG. 7.

In Step 6, an ASN where the relay PC is located forwards the LU response message to the BS (PA). The message includes new PG ID, PAGING_CYCLE, or PAGING_OFFSET, and may also include the following information: AK and AK context, and anchor authenticator ID.

If the BS does not obtain available AK and AK context directly after receiving the LU response message from the relay PC, the BS obtains the anchor authenticator ID and sends a context request message to an ASN where the anchor authenticator is located to request for an AK and uses the AK to verify the received RNG-REQ message. If the verification succeeds, the BS sends a ranging response message including HMAC/CMAC to the MS.

Figure 8:
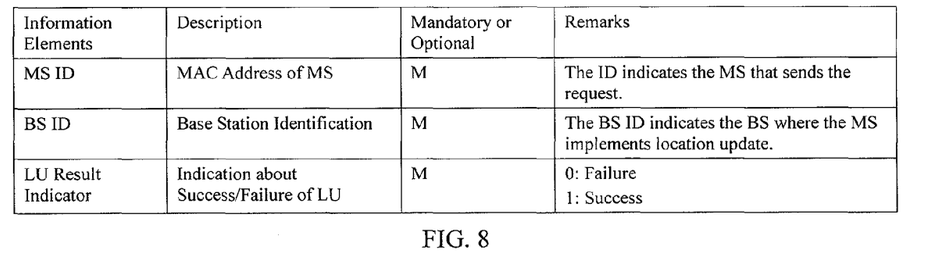
FIG. 8 is a table showing a primitive structure of a LU acknowledgement message in the prior art.

In Step 7, if the RNG-REQ message is successfully verified, the BS (PA) sends a LU acknowledgement message (including MS ID, BS ID, and result indication) to the relay PC to indicate that the LU from the MS has been authenticated and processed successfully. A primitive structure of the LU acknowledgement message is shown in FIG. 8.

The LU acknowledgement message sent to the anchor PC by the relay PC includes result indication, relay PC ID, new PG ID, and PAGING_CYCLE and PAGING_OFFSET assigned by the relay PC. After receiving the LU acknowledgement message, the anchor PC finally updates the MS location information in the LR.

In Step 2 of the above process of performing the LU by the MS, the BS sends the LU request message to the relay PC, and the relay PC determines that the current PC is far away from the original anchor PC and it is necessary to assign a new anchor PC, according to information (for example, PC ID and BS ID) included in the message. Therefore, the LU request message sent to the anchor PC by the relay PC includes an address of the new anchor PC assigned by the relay PC, i.e. an redirection address of the anchor PC (PCID). The anchor PC is optionally assigned by the relay PC, and alternatively, a new anchor PC may be assigned by the current anchor PC. If it is the relay PC that assigns the new anchor PC, the current anchor PC has the right to decide whether to accept or refuse to be the new anchor PC.

However, after the anchor PC is redirected, the FA does not know the address of the new anchor PC in the paging process. When Step 2 of the paging process in the WiMAX communication system in the prior art is performed, the anchor FA needs to send a MS_Info_Request message to the anchor PC/LR, so as to obtain paging information of the MS and request paging for the MS. However, since the FA does not know the address of the new anchor PC, the data cannot be transmitted to the new anchor PC from the FA and cannot be transmitted to the called MS accordingly. Thus, the paging process cannot be implemented.

Therefore, there is a need of an information management method, which enables the FA to obtain an address of a new anchor PC and thus perform information interaction with the PC, thereby implementing a paging process.

SUMMARY

Accordingly, the present invention is directed to an information management method and system, in which a foreign agent (FA) is enabled to obtain an address of a new anchor paging controller (PC) and thus performs information interaction with the PC, thereby implementing a paging process.

The objectives of the present invention are achieved through the following technical solutions.

An information management method is provided, which includes the following steps.

After a PC is redirected, a first message is sent to a FA of a mobile station (MS). The first message includes information of a new PC after redirection.

The FA stores the information of the new PC.

Figure 18:
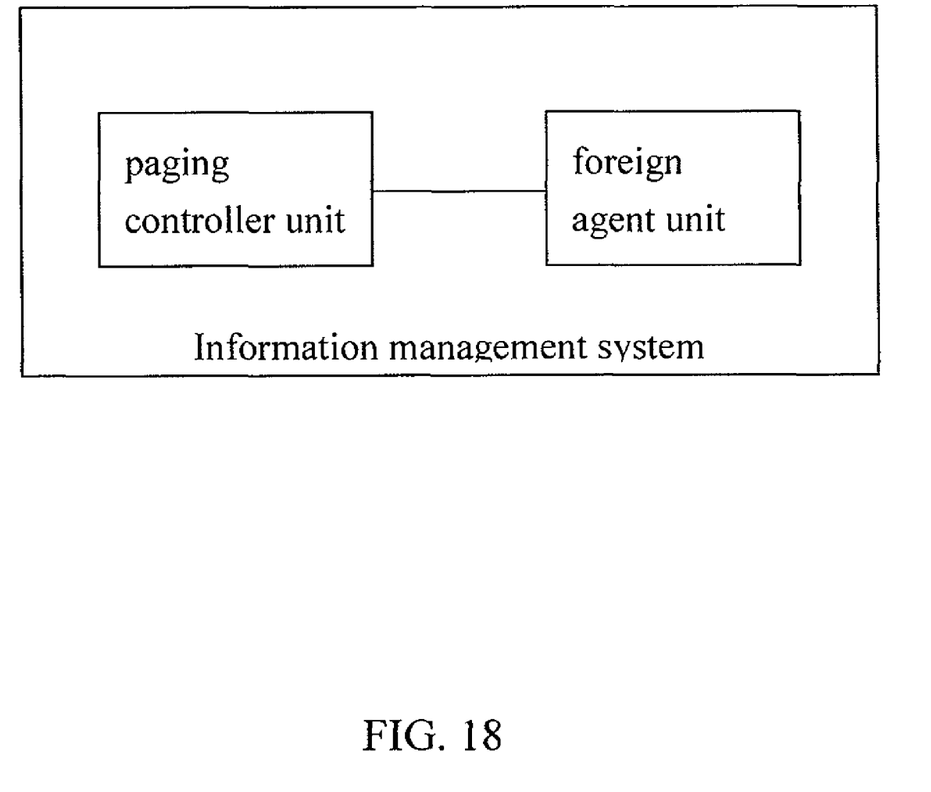
FIG. 18 is a schematic structural view of an information management system.

As shown in the FIG. 18, an information management system is provided, which includes a PC unit and a FA unit.

The PC unit is adapted to send a message including information of a new PC after redirection to a FA of a MS by a PC before redirection or the new PC after redirection, once the PC is redirected.

The FA unit is adapted to store the information of the new PC sent from the PC unit.

The following technical effects are achieved by the present invention through the above technical solutions. The anchor PC before redirection or the new anchor PC after redirection reports an ID of the new anchor PC to the FA, so the FA gets to know an address of the new anchor PC when paging and thus implements the paging process successfully.

BRIEF DESCRIPTION OF THE DRAWINGS

The present invention will become more fully understood from the detailed description given herein below for illustration only, and thus is not limitative of the present invention.

FIG. 6 is a table showing a primitive structure of a MS_Info_Response message in the prior art;

FIG. 7 is a table showing a primitive structure of a LU response message in the prior art;

DETAILED DESCRIPTION

Embodiments of the present invention are described below with reference to the accompanying drawings.

First Embodiment

Figure 9:
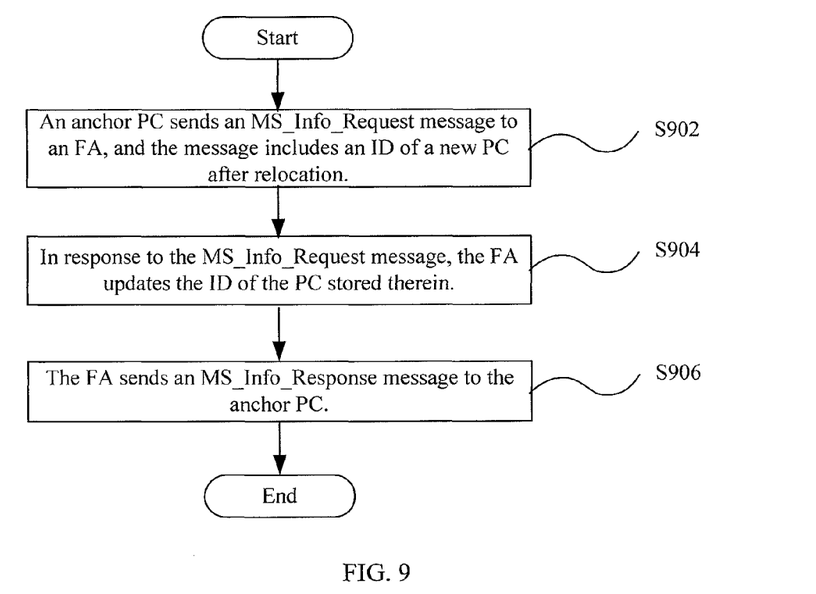
FIG. 9 is a flow chart of an information management method, according to the present invention.

Referring to FIG. 9, an information management method of the present invention includes the following steps.

In Step S902, after an anchor PC is redirected, a MS_Info_Request message is sent to an FA. The message includes an ID of a new PC after redirection. In Step S904, in response to the MS_Info_Request message, the FA updates the ID of the PC stored therein. In Step S906, the FA sends a MS_Info_Response message.

In particular, the MS_Info_Request message may be sent either by the anchor PC before redirection or by the anchor PC after redirection.

Figure 10:
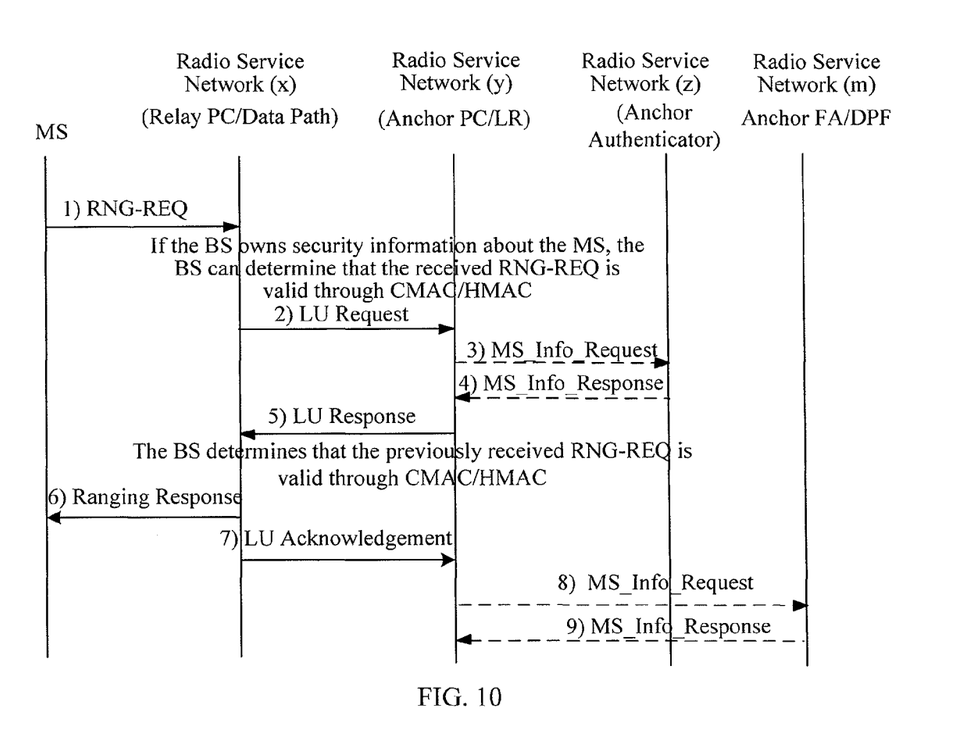
FIG. 10 is a signaling flow chart of an information management method, according to a first embodiment of the present invention.
Figure 11:
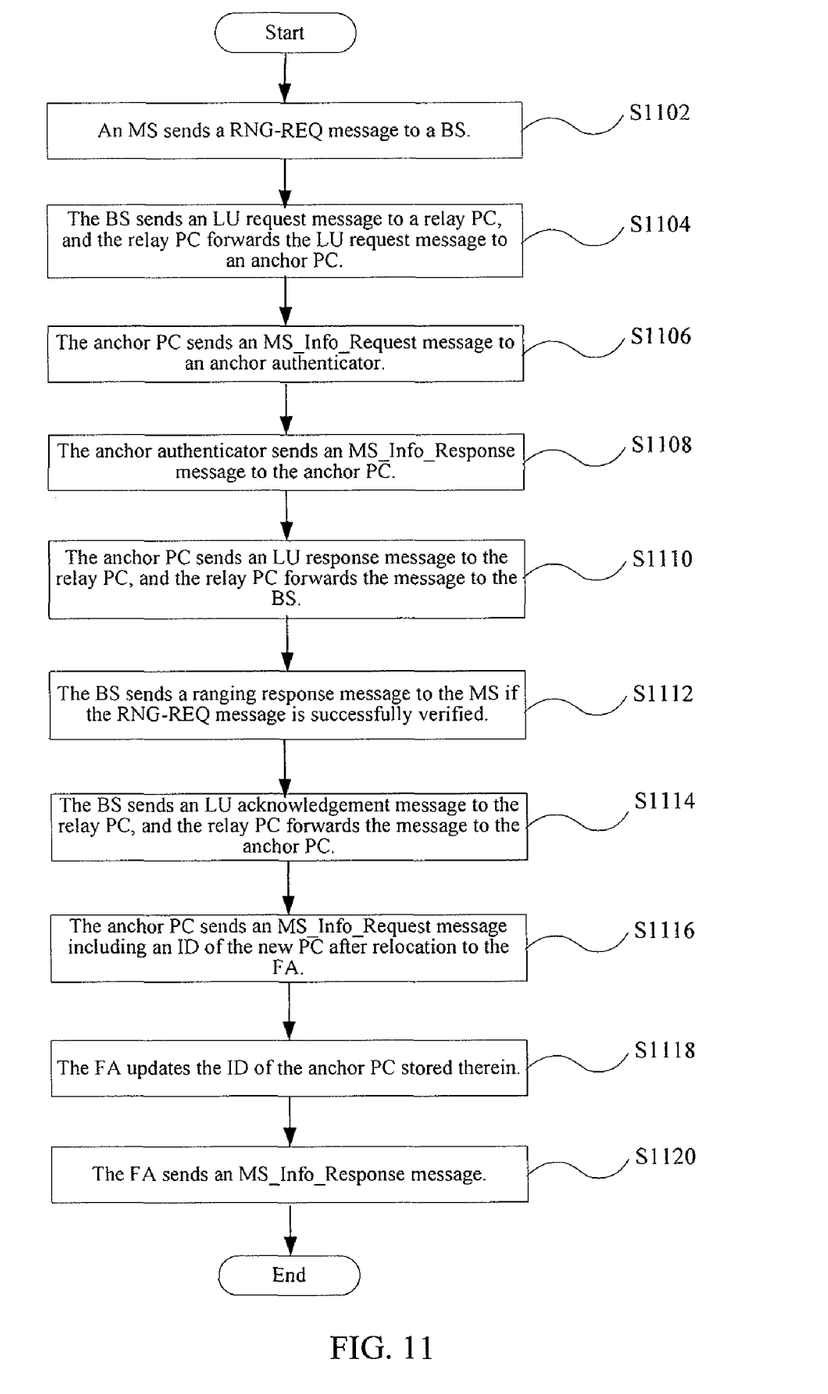
FIG. 11 is a flow chart of the information management method, according to the first embodiment of the present invention.

In this embodiment, the process of sending the MS_Info_Request message by the anchor PC before redirection is described below with reference to FIGS. 10 and 11. FIG. 10 is a signaling flow chart of an information management method according to the first embodiment of the present invention, and FIG. 11 is a flow chart of the information management method according to the first embodiment of the present invention.

In Step S1102, a MS sends a RNG-REQ message to a BS. In Step S1104, the BS sends a location update (LU) request message to a relay PC, and the relay PC forwards the LU request message to an anchor PC. Then, in Step S1106, if an anchor authenticator stores some security information, the anchor PC sends an MS_Info_Request message to the anchor authenticator in response to the LU request message. In Step S1108, the anchor authenticator sends an MS_Info_Response message to the anchor PC.

Then, in Step S1110, the anchor PC sends a LU response message to the relay PC in response to the MS_Info_Response message, and the relay PC forwards the LU response message to the BS. In Step S112, the BS verifies the received RNG-REQ message with an authentication key (AK), and sends a ranging response message to the MS if the verification succeeds. In Step S1114, the BS sends a LU acknowledgement message to the relay PC, and the relay PC forwards the message to the anchor PC.

In Step S1116, the anchor PC sends a MS_Info_Request message, including an ID of the new PC after redirection to the FA. In Step S1118, the FA updates the ID of the anchor PC stored therein. Finally, in Step S1120, the FA sends a MS_Info_Response message to the anchor PC.

Figure 12:
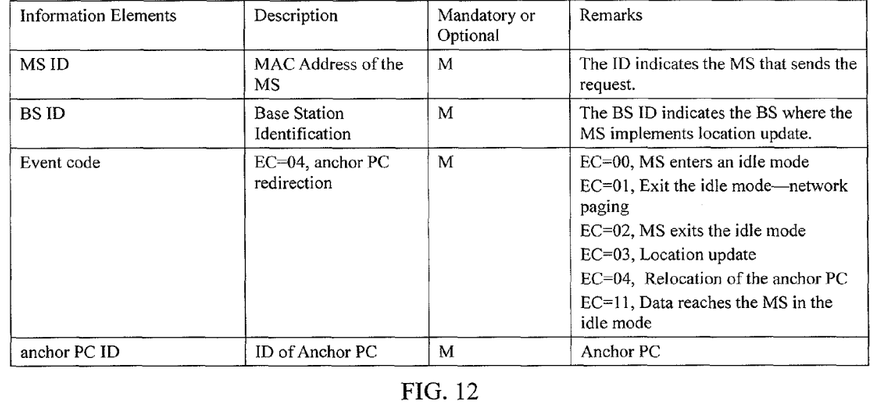
FIG. 12 is a table showing a primitive structure of a MS_Info_Request message, according to the first embodiment of the present invention.
Figure 13:
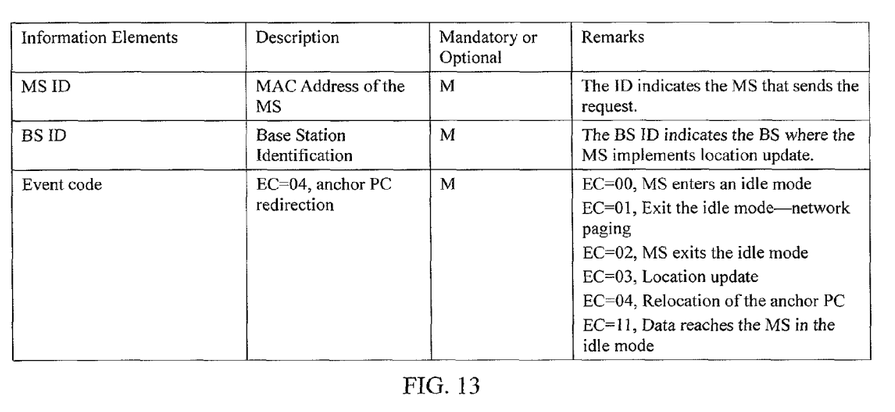
FIG. 13 is a table showing a primitive structure of a MS_Info_Response message, according to the first embodiment of the present invention.

FIGS. 12 and 13, respectively, show a primitive structure of the MS_Info_Request message and a primitive structure of the MS_Info_Response message. As shown in the tables, the existing MS_Info_Request message and MS_Info_Response message in the WiMAX are extended through the technical solutions of the present invention, and the two messages adopt EC=04 in the Event Code field to represent performing the anchor PC redirection.

Second Embodiment

Figure 14:
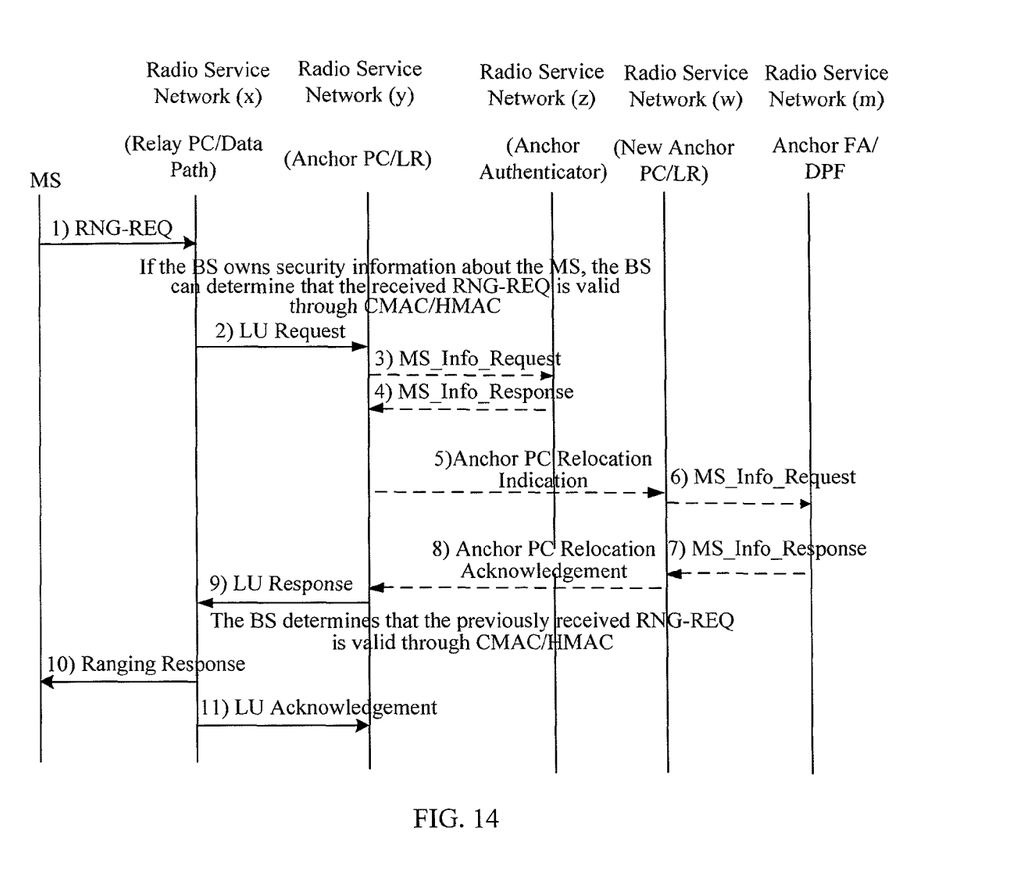
FIG. 14 is a signaling flow chart of an information management method, according to a second embodiment of the present invention.
Figure 15:
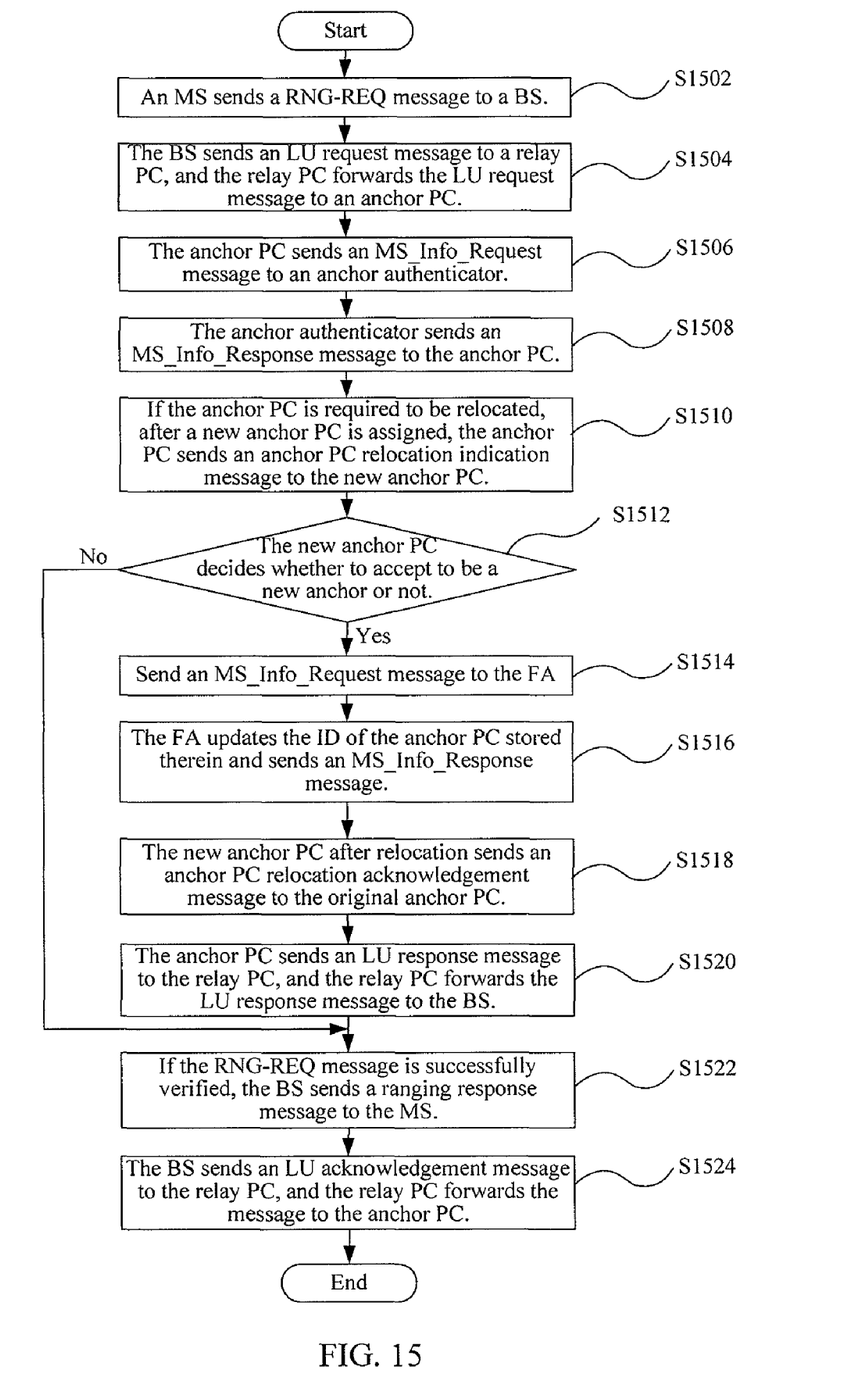
FIG. 15 is a flow chart of the information management method, according to the second embodiment of the present invention.
Figure 16:
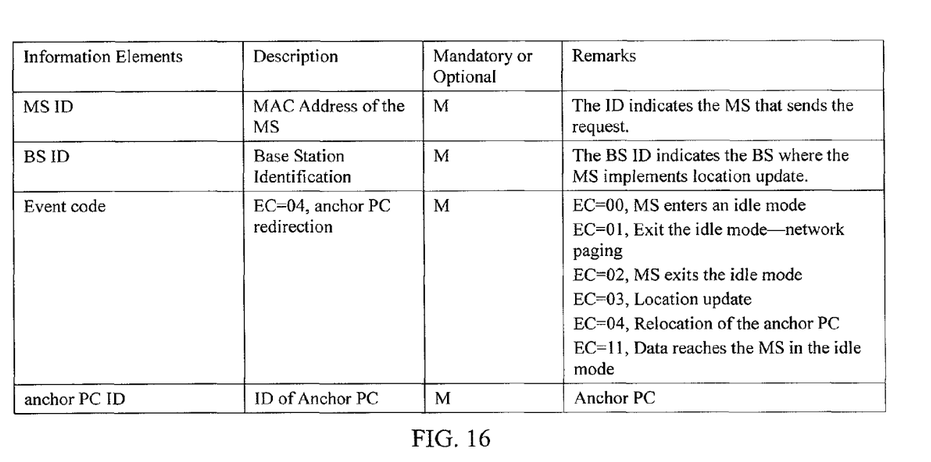
FIG. 16 is a table showing a primitive structure of a MS_Info_Request message, according to the second embodiment of the present invention.
Figure 17:
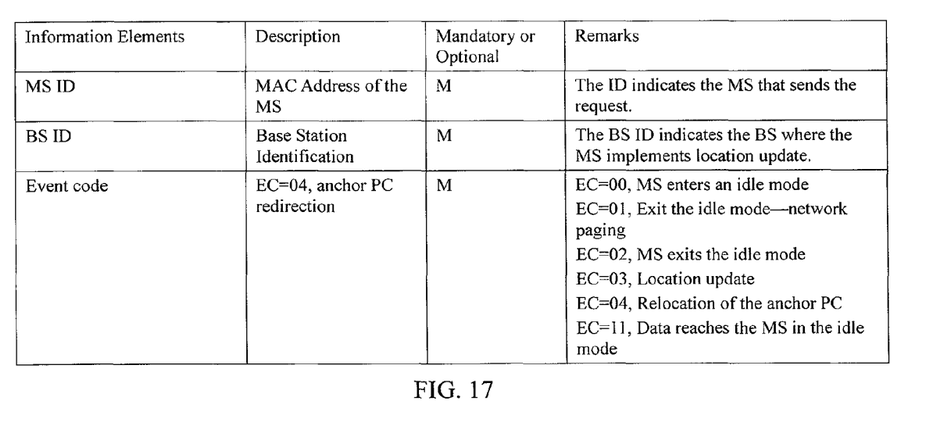
FIG. 17 is a table showing a primitive structure of a MS_Info_Response message, according to the second embodiment of the present invention.

The second embodiment of the present invention is described below with reference to FIGS. 14 and 15. In this embodiment, the MS_Info_Request message is sent by the new anchor PC after redirection.

In Step S1502, a MS sends a RNG-REQ message to a BS. In Step S1504, the BS sends a LU request message to a relay PC, and the relay PC forwards the LU request message to an anchor PC. Then, in Step S1506, if an anchor authenticator stores some security information, the anchor PC sends a MS_Info_Request message to the anchor authenticator in response to the LU request message. In Step S1508, the anchor authenticator sends a MS_Info_Response message to the anchor PC.

In Step S1510, if the anchor PC is required to be redirected, after a new anchor PC is assigned, the original anchor PC before redirection sends an anchor PC redirection indication message to the new anchor PC, so as to indicate the new anchor PC to become a new anchor.

Then, in Step S1512, the new anchor PC decides whether to accept to be a new anchor or not. If yes, in Step S1514, the new anchor PC sends a MS_Info_Request message to the FA, notifies the FA that an anchor PC redirection is performed, and reports its own ID. In Step S1516, the FA updates the ID of the anchor PC stored therein and sends a MS_Info_Response message. Afterwards, in Step S1518, the new anchor PC after redirection sends an anchor PC redirection acknowledgement message to the original anchor PC. On the contrary, if the new anchor PC refuses to act as a new anchor, it directly turns to Step S1518 after Step S1512. At this time, the anchor PC redirection acknowledgement message includes a rebuff indication.

In Step S1520, the original anchor PC sends a LU response message to the relay PC, and the relay PC forwards the LU response message to the BS. The LU response message includes an indication about whether the new anchor PC accepts or refuses the redirection. If the new anchor PC accepts the redirection, the LU response message further includes an ID of the new anchor PC. In Step S1522, if the RNG-REQ message is successfully verified, the BS sends a ranging response message to the MS. Finally, in Step S1524, the BS sends a LU acknowledgement message to the relay PC, and the relay PC forwards the message to the anchor PC.

It should be noted that the above steps and processes are merely exemplary, but not intended to limit the present invention, which can also be implemented in any reasonable order, according to requirements for technical implementations.

The above descriptions are merely preferred embodiments of the present invention, but not intend to limit the scope of the present invention. It will be apparent to those skilled in the art that various modifications and variations can be made to the structure of the present invention without departing from the scope or spirit of the invention. In view of the foregoing, it is intended that the present invention cover modifications and variations of this invention provided that they fall within the scope of the following claims and their equivalents.

What is claimed is:

1. An information management method, comprising:
    receiving, by a base station, a ranging request message from a mobile station;
    sending, by the base station, a location update request message to a relay paging controller, and forwarding, by the relay paging controller, the location update request message to an anchor paging controller of the mobile station;
    sending, by the anchor paging controller, a mobile station information request message to an anchor authenticator, and sending, by the anchor authenticator, a mobile station information response message to the anchor paging controller;

sending, by the anchor paging controller, a location update response message to the relay paging controller in response to the mobile station information response message, and forwarding, by the relay paging controller, the location update response message to the base station;

verifying, by the base station, the received ranging request message with an authentication key, sending a ranging response message to the mobile station if verification is successful sending, by the base station, a location update acknowledgement message to the relay paging controller, and sending, by the relay paging controller, the location update acknowledgement message to the anchor paging controller;

sending, by the anchor paging controller, a first message to a foreign agent of the mobile station after the anchor paging controller is redirected, wherein the first message comprises information of a new paging controller after redirection; and storing, by the foreign agent, the information of the new paging controller.

2. An information management method, comprising:

receiving, by a base station, a ranging request message from a mobile station;

sending, by the base station, a location update request message to a relay paging controller, and sending, by the relay paging controller, the location update request message to a current anchor paging controller of the mobile station;

sending, by the current anchor paging controller, a mobile station information request message to an anchor authenticator, and sending, by the anchor authenticator, a mobile station information response message to the current anchor paging controller;

when the anchor paging controller is required to be redirected, and after a new anchor paging controller is assigned, sending, by the current anchor paging controller, an anchor paging controller redirection indication message to the new anchor paging controller so as to indicate the new anchor paging controller is to become a new anchor;

deciding, by the new anchor paging controller, whether to accept becoming the new anchor or not in response to the anchor paging controller redirection indication message; and if the new anchor paging controller accepts becoming the new anchor, sending a first message to the foreign agent of the mobile station, and sending an anchor paging controller redirection acknowledgement message comprising success indication information to the current anchor paging controller after receiving the second message.

3. The information management method according to claim 2, further comprising:

sending, by the current anchor paging controller, a location update response message to the relay paging controller, and forwarding, by the relay paging controller, the location update response message to the base station, wherein the location update response message comprises an acceptance indication or a rebuff indication of whether the new anchor paging controller accepts or refuses the redirection, and if the new anchor paging controller accepts the redirection, the location update response message further comprises an ID of the new anchor paging controller;

if a verification of the ranging request message is successful, sending, by the base station, a ranging response message to the mobile station; and sending, by the base station, a location update acknowledgement message to the relay paging controller, and forwarding, by the relay paging controller, the location update acknowledgement message to the current anchor paging controller.

4. The information management method according to claim 2, comprising:

if the new anchor paging controller does not accept becoming the new anchor, directly sending an anchor paging controller redirection acknowledgement message comprising rebuff indication information to the current anchor paging controller.

* * * * *